(12) United States Patent
Yamanaka et al.

(10) Patent No.: US 6,378,083 B1
(45) Date of Patent: Apr. 23, 2002

(54) WATCH DOG TIMER DEVICE

(75) Inventors: Hideki Yamanaka; Seiji Hinata, both of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1249 days.

(21) Appl. No.: 08/686,477

(22) Filed: Jul. 26, 1996

Related U.S. Application Data

(63) Continuation of application No. 08/355,909, filed on Dec. 14, 1994, now abandoned.

(30) Foreign Application Priority Data

Dec. 15, 1993 (JP) .............................. 5-315096

(51) Int. Cl.$^7$ .............................................. G06F 1/04
(52) U.S. Cl. ..................................................... 713/601
(58) Field of Search ................... 395/557, 560; 713/601

(56) References Cited

U.S. PATENT DOCUMENTS

| | | | | |
|---|---|---|---|---|
| 4,072,852 A | * | 2/1978 | Hogan et al. ................... 714/15 |
| 4,131,945 A | * | 12/1978 | Richardson et al. ... 395/185.08 |
| 4,137,565 A | * | 1/1979 | Mager et al. ................. 395/842 |
| 4,293,908 A | * | 10/1981 | Bradley et al. ............. 395/842 |
| 4,377,000 A | * | 3/1983 | Staab ........................... 714/55 |
| 4,502,117 A | * | 2/1985 | Kihara ........................ 395/848 |
| 4,530,053 A | * | 7/1985 | Kriz et al. .................... 710/22 |
| 4,611,279 A | * | 9/1986 | Andresen et al. ........... 711/106 |
| 4,639,852 A | * | 1/1987 | Motomiya et al. ............. 700/9 |
| 4,669,043 A | * | 5/1987 | Kaplinski ........................ 74/3 |
| 4,688,166 A | * | 8/1987 | Schneider .................... 710/45 |
| 4,814,984 A | * | 3/1989 | Thompson .................. 709/209 |
| 4,916,692 A | * | 4/1990 | Clarke ......................... 370/451 |
| 5,185,693 A | * | 2/1993 | Loftis et al. ................. 364/187 |
| 5,253,346 A | * | 10/1993 | Okabayashi et al. ........ 709/218 |
| 5,440,603 A | * | 8/1995 | Sugita .......................... 377/20 |
| 5,535,362 A | * | 7/1996 | Ami et al. .................. 395/474 |

OTHER PUBLICATIONS

Carr, Joseph, J., "Microprocessor Interfacing", Tab Books Inc., 1982, pp. 11, 17.*

* cited by examiner

*Primary Examiner*—St. John Courtenay, III
(74) *Attorney, Agent, or Firm*—Oblon, Spivak, McClelland, Maier & Neustadt, P.C.

(57) ABSTRACT

A watch dog timer capable of detecting a runaway state of a system including a CPU and DMAC has a watch dog timer and a count clock controller. The watch dog timer counts the number of clock and stores a count result, and transmits a watch dog time out signal to other devices in the system if the number of clocks is over a predetermined value. The count clock controller receives the clock and transmits the clock to the watch dog timer, and halts the transmission of the clock to the watch dog timer when the CPU transmits a bus permission signal to the DMAC.

22 Claims, 5 Drawing Sheets

WATCH DOG TIMER DEVICE

This application is a Continuation of application Ser. No. 08/355,909, filed on Dec. 14, 1994, now abandoned.

BACKGROUND OF THE INVENTION

1. Field of the Invention

The present invention relates to a watch dog timer device used for a microprocessor system, and, in particular, to a watch dog timer device for use in a highly reliable microprocessor system having a system but master other than a Central Processing Unit (CPU) such as a Direct Memory Access Controller (DMAC), a Dynamic Random Access Memory (DMAC) refresh (RAS only), and the like. The invention allows for the detection of program runaway.

2. Description of the Prior Art

Conventionally, a function for resetting a system is adopted to detect an occurrence of a program runaway in order to increase the reliability of a system containing a CPU. A watchdog timer is normally used for this purpose.

The watchdog timer sets a value on a preset timer for a time period which is a time-out from a program runaway, and acts to implement a normal timer clearance within the range of the set value by a CPU instruction. In the case where the program is functioning normally under set conditions of this type, before the timing of a time-out detected by the timer, the timer is cleared by the CPU so that the system is considered to operate normally.

As opposed to this, in the case where a timer clearance for the timer has not been executed by a CPU instruction but is mainly caused by an abnormality such as a program runaway or the like, the watch dog timer which has not been cleared overflows from a time-out. Specifically, an abnormal signal is generated by the watch dog timer corresponding to an abnormal operation such as a program runaway, and an overflow signal is transmitted to a CPU and other external devices. The system is optionally reset using this overflow signal from the watch dog timer device, or a non-maskable interrupt (NMI) process or the like is carried out, so that the system is finally returned to a normal operational state.

There is a microprocessor system including a bus master such as a DMAC or the like. In this type of the system the CPU in the system cannot clear a time period set in the watch dog timer device during the operation of the DMAC. For this reason, the existence of a bus master such as a DMAC or the like in a microprocessor system has a large influence on the use of a watch dog timer. Specifically, while the DMAC uses the bus for a direct memory access operation for internal and external memories such as, for example, a cache memory, external hard disk drives, and the like, it is not possible to provide a clearance signal in order to reset the time period of the watch dog timer through the bus from the CPU. Therefore a time period occurs in which the watch dog timer cannot be cleared. Avoiding this problem requires an appreciable amount of restrictions on the microprocessor system in operation and hardware. In general, it is impossible to avoid these restrictions.

In order to avoid these restrictions when a watch dog timer device is incorporated in the conventional microprocessor system, for example, when a bus master such as a DMAC or the like is present in a microprocessor system, an interrupt operation is required prior to a commencement of a DMA operation so that the watch dog timer does not operate.

FIG. 1 is a block diagram of a conventional microprocessor system incorporating a conventional watch dog timer device. As illustrated in FIG. 1, a CPU 1, a runaway detection circuit 2, and a DMAC 3 are connected to a control bus 6. A transmission request holding circuit 4 is connected to the DMAC 3. The CPU 1 has a function for releasing use of the control bus 6 to other devices. The runaway detection circuit 2 has a configuration including a watch dog timer with a program runaway detection function. The runaway detection circuit 2 receives a timer clearance signal from the CPU 1 prior to the time-out, but when the timer has not been cleared from whatever cause, the runaway detection circuit 2 overflows at the timing of the time out, and a Watch Dog Time Out signal (WDT OUT) S3 is transmitted to the CPU 1, the DMAC 3, and the other circuits through a special-purpose lines SPL.

The DMAC 3 has a request function for the right to use the control bus 6. The direct memory access controller DMAC 3 receives a Direct Memory Access (DMA) transmission request S2 from the transmission request storage circuit 4 and a bus request S4 is transferred to the CPU 1, while a bus permission signal S5 is received from the CPU 1.

FIG. 2 shows a configuration of the transmission request storage circuit 4.

The transmission request storage circuit 4 monitors the prohibition or approval state of the runaway detection circuit 2 by means of a DMA transmission request S1, and has the function of storing the DMA transmission request.

Specifically, as shown in FIG. 2, the DMA transmission request signal S1 is transmitted to a terminal A of the transmission request storage circuit 4, and a port output (DMA permission signal S7 is transmitted to a terminal D of the transmission request storage circuit 4 from the CPU 1. An interrupt request signal S6 is transmitted from a terminal C in the transmission request storage circuit 4 to the CPU 1 and the DMA transmission request signal S2 is transmitted from a terminal B in the transmission request storage circuit 4 to the DMAC 3.

The DMA transmission request signal Si received at the terminal A and the port output (DMA permission signal) S7 received at the terminal D are provided together to logic circuits 8, 10, and 11 in the transmission request storage circuit 4.

The DMA transmission request signal S2 is transmitted from a logic circuit 11 through the terminal B to the DMAC 3. In addition, the output from the logic circuits 8 and 10 are transmitted through a logic circuit 9 and the terminal C to the CPU 1 as the interrupt request signal S6.

In the above-described configuration of the transmission request storage circuit 4 shown in FIG. 2, a timer clearance signal or a timer reset signal is received from the CPU 1 via the control bus 6 during normal operation so that there is no time-out in the runaway detection circuit 2. However, the program runs away from some cause, and there is no timer reset signal from the CPU 1 to the runaway detection circuit 2. In this case, the runaway detection circuit 2 enters an overflow state as a result of the time-out, and transmits a Watch Dog Time OUT (WDTOUT) signal S3 for use of a reset operation to the runaway detection circuit itself 2, the CPU 1, the DMAC 3, and external devices (not shown) through special purpose lines.

Next, the operation of the DMAC 3 will be explained with reference to the timing chart shown in FIG. 3. In FIG. 3 the letter (A) designates the state of the DMA transmission request signal S1, (B) designates the state of the DMA transmission request signal S2, (C) designates the state of the interrupt request signal S6, (D) designates the state of the port output (DMA permission signal) S7, and (E) designates the state of the bus cycle of the control bus 6.

First, at a time t1 at which the control bus 6 is in a normal cycle condition, the DMA transmission request signal S1 changes from a high level (H level) to a low level (L level). In this case, the DMA transmission request signal S1 is transmitted to the transmission request storage circuit 4 from external devices. At this time the interrupt request S6 is transmitted from the transmission request storage circuit 4 to the CPU 1. On receipt of this interrupt request S6, the CPU 1 processes an interrupt operation during from a time t2 to a time t4, and prohibits operation of the runaway detection circuit 2. At a time t3 after this interrupt operation has been completed, the port output (DMA permission signal) S7 is returned from the CPU 1 to the transmission request storage circuit 4. As a result, the DMA transmission request signal S2 is transmitted from the transmission request storage circuit 4 to the DMAC 3. The DMA controller 3 transmits the bus request signal S4 to the CPU 1 based on the DMA transmission request signal S2 and receives the bus permission signal S5 from the CPU 1.

The DMAC 3 which has received the bus request signal S4 commences DMA transmission from a time t4, and the control bus 6 also enters the DMA transmission at this time.

At a time t5, when the DMA transmission is completed, the DMA transmission request signal S1 is changed from the Low level to the High level, and, simultaneously the DMA transmission request signal S2 is also changed from the Low level to the High level. In addition, the interrupt request S6 is transmitted from the transmission request storage circuit 4 to the CPU 1 and interrupt processing is commenced by the CPU 1 via the control bus 6, and the operation of the runaway detection circuit 2 is commenced. Then, at a time t6 when this processing is completed, the port output (DMA permission signal) S7 is returned to the transmission request storage circuit 4. As a result the control bus 6 reverts to the normal cycle.

As outlined above, in a system wherein the DMAC 3 functions as a bus master, the operation of the runaway detection circuit 2 is prohibited by an interrupt process in advance of the operation of the DMAC 3 so that an occurrence of a poor condition such as the transmission of an overflow signal by the runaway detection circuit 2 during the Direct Memory Access operation is prohibited.

A conventional watch dog timer device is incorporated in a microprocessor system, as outlined above, and an interrupt process is executed by the CPU 1 in response to a start request from the DMAC 3. Then, the CPU 1 performs an interrupt operation whereby the runaway detection circuit 2 is temporarily halted or cleared. Next, the DMAC 3 uses the control bus 6. After completion of the DMA process by the DMAC 3, the operation of the runaway detection circuit 2 is once again started or cleared. For this reason, it is necessary to provide special hardware and software for realizing the above-mentioned operation. In addition, there is the problem that the process response of the DMA controller 3 is reduced, and the whole system performance is worsened from excess interrupt processing.

In order to avoid this type of problem, a method by which the transmission mode is restricted by the DMAC 3 has been considered. For example, burst transmission and multiplex transmission is prohibited, and when burst transmission is necessary, the addition of restrictions such as cycle steal transmission has been considered.

In order to provide the above type of process such as burst transmission, multiplex transmission and the like, various restrictions to the process must be authorized and the set value for the time-out of the runaway detection circuit 2 made large, to be able to execute the transmission process reliably by means of the DMAC 3. However, it is believed that there are also cases where the runaway detection circuit 2 overflows during a transmission process using the DMAC 3 from the timing, so this cannot be said to be a reliable method.

As outlined above, with a conventional watch dog timer device, when full consideration is given to the watch dog timer operation, a drop in the performance of the full system and a drop in reliability must be expected. There are cases where watch dog timer is not adopted in a system where much importance is placed on actual performance, even when countermeasures against system runaway are sacrificed.

SUMMARY OF THE INVENTION

Accordingly, an object of the present invention is, with due consideration to the drawbacks of such conventional watch dog timer devices, to provide a watch dog timer-device wherein, in a system where a bus master such as a DMAC or the like is present, a clock pulse to the watch dog timer is prohibited during the operation of the bus master, and by clearing a counter incorporated in a watch dog timer device with another system, the system performance is not impaired because the watch dog timer function is temporarily halted, so that it is possible to incorporate the watch dog timer into a system including a bus master without any countermeasure.

In order to solve the conventional problem described above, the present invention provides a watch dog timer device, incorporated in a microprocessor system, capable of detecting a runaway state of said microprocessor system including a CPU and a direct memory access controller (DMAC) which is connected to a bus. The system includes a watch dog timer for receiving a count clock signal, counting the number of the count clock signal and storing a count result, receiving a reset signal to reset the count result stored in the watch dog timer at each specified time period, and transmitting a watch dog time out signal to the CPU, the watch dog timer itself, and external devices indicate the existence of an abnormal state of the microprocessor system when a count result is over a predetermined value.

The system further includes a count clock controller for receiving the count clock signal transmitted from an external device and transmitting the count clock signal to the watch dog timer, and for halting a transmission of the count clock signal transmitted from an external device to the watch dog timer when the CPU transmits a bus permission signal for using the bus by the DMAC.

As an alternative embodiment, the count clock controller halts a transmission of the count clock signal transmitted from an external device to the watch dog timer when the DMAC uses said bus. The count clock controller may be implemented using two NOR circuits.

In another preferred embodiment of the present invention, in place of the count clock controller, there is a timer controller for forcing a reset of the watch dog timer when the CPU transmits a bus permission signal for using the bus by the DMAC.

The invention operates by running the watch dog timer. When a direct memory access (DMA) transfer is desired, a DMA controller issues a request to the CPU. After processing the DMA request, the CPU issues a bus permission signal. The bus permission signal is received by both the watch dog timer and the DMA controller. In response to the bus permission signal, the watch dog timer is stopped and the DMA transfer is performed by the DMA controller.

The invention advantageously operates without using a microprocessor interrupt when processing the DMA transfer request. Additionally, it is not necessary to use the control bus when processing the DMA request because a dedicated line for carrying the DMA request from the DMA controller to the CPU, and a dedicated line, different from the control bus, for carrying the bus permission signal to the watch dog timer and the DMA controller are used.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Embodiments of the present invention will now be explained with reference to the drawings.

Figure 1:
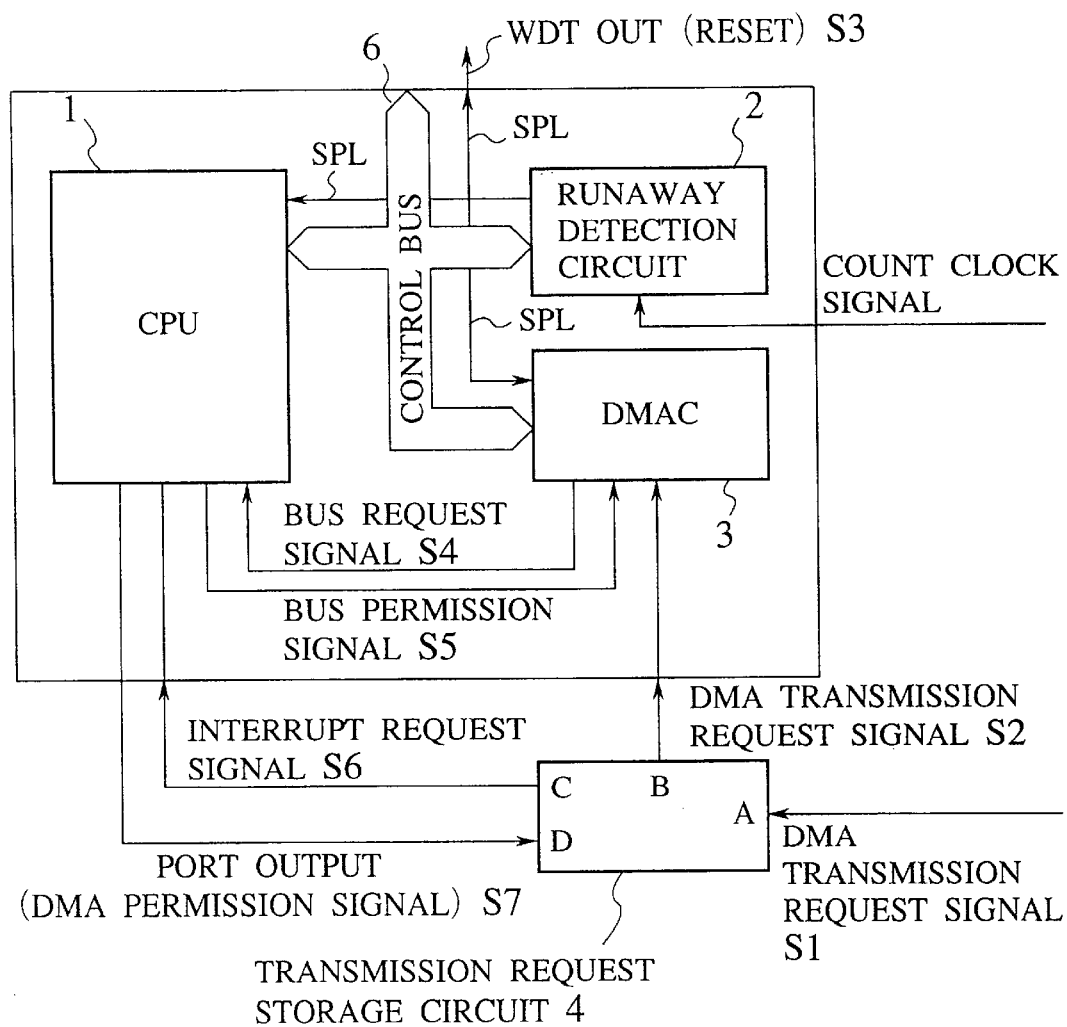
FIG. 1 is a block diagram of a microprocessor system including a conventional watch dog timer device.
Figure 2:
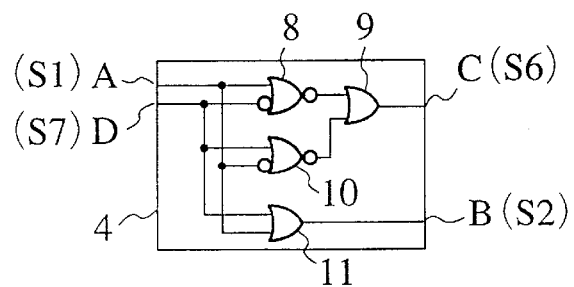
FIG. 2 is a block diagram illustrating the configuration of a transmission request storage circuit incorporated in the system shown in FIG. 1.
Figure 3:
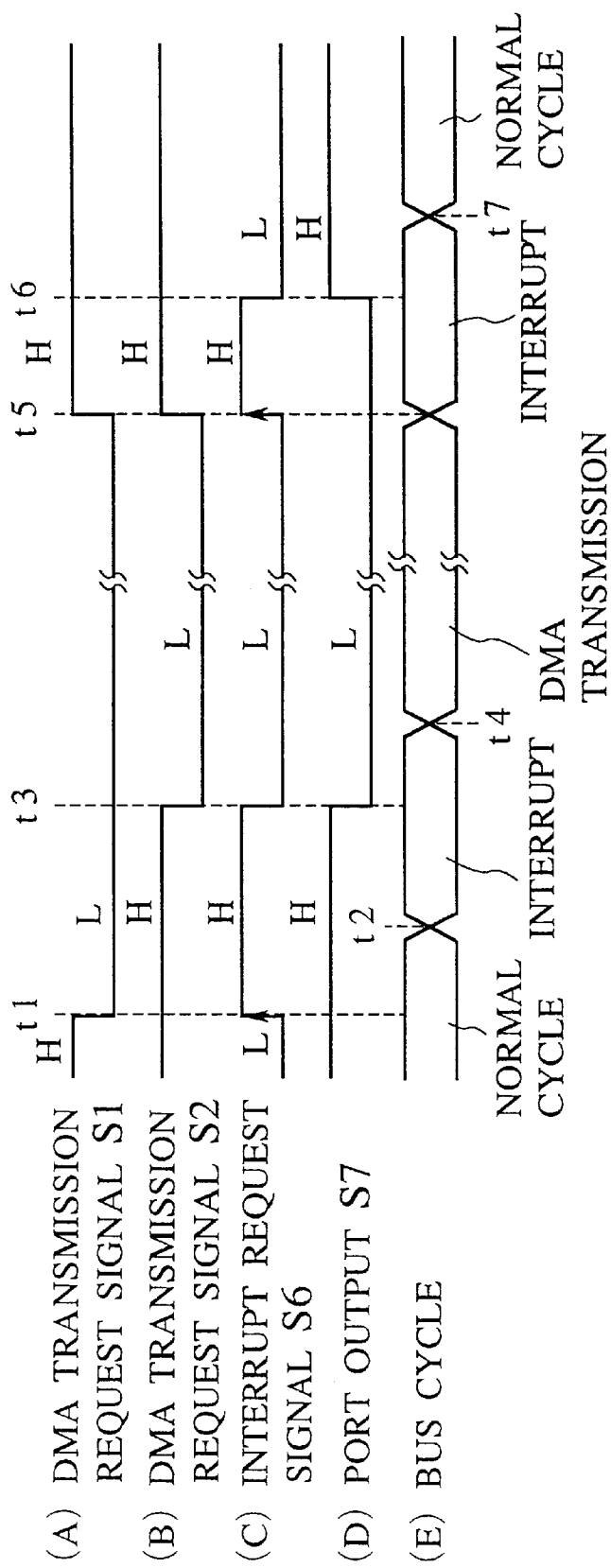
FIG. 3 is a timing chart for explaining the operation of the system shown in FIG. 1.
Figure 4:
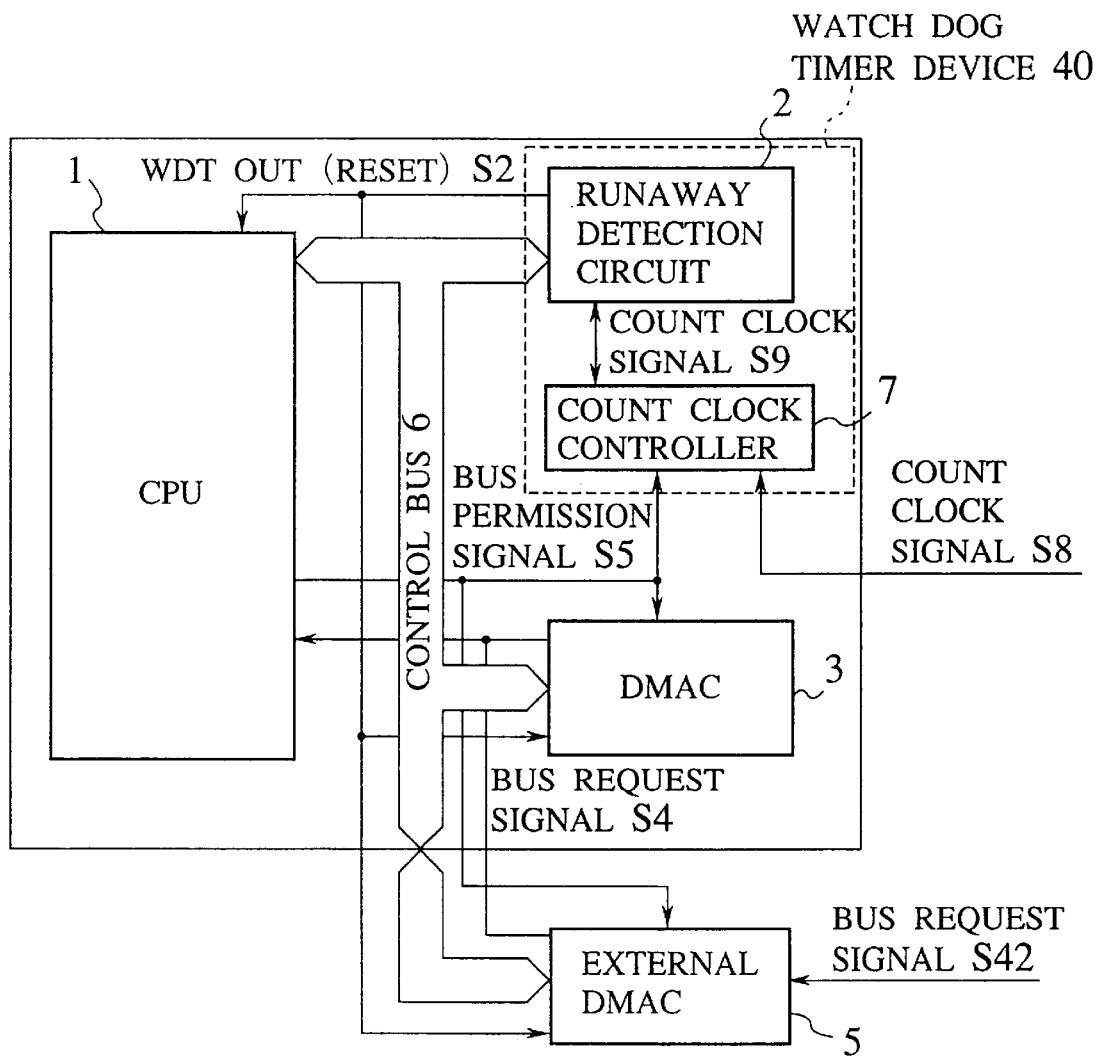
FIG. 4 is a block diagram of a watch dog timer device incorporated in a microprocessor system as a first embodiment of the present invention.

FIG. 4 is a block diagram of a microprocessor system incorporating a watch dog timer device 40 as a first embodiment of the present invention.

As shown in FIG. 4, an external DMA controller (an external DMAC) 5 is a bus master which receives a bus request signal S42 transmitted from an external device (not shown) to use a control bus 6 and transmits a bus request signal S4 to the CPU 1. The DMAC 3 also transmits the bus request signal S4 to the CPU 1. The CPU 1 receives the bus request signal S4 from the DMAC 3 and the external DMAC 5 and transfers a bus permission signal S5 to the DMAC 3 and the external DMAC 5 based on the bus request signal S4. The bus permission signal S5 is the right to use the control bus 6. A watch dog timer device 40 which is the feature of the first embodiment of the present invention comprises a runaway detection circuit 2 and a count clock control circuit 7. The count clock control circuit 7 receives a count clock signal S8 to be provided essentially directly to a runaway detection circuit 2, and to be provided to the runaway detection circuit 2 as a count clock signal S9.

In a normal operation, the runaway detection circuit 2 counts the number of the count clock signal S9 transmitted from the count clock control circuit 7.

The count clock control circuit 7 prohibits the transmission of the count clock signal S9 to the runaway detection circuit 2 in the case where the bus permission signal S5 is transferred to the DMAC 3 or the external DMAC 5, so that there is no time-out in the runaway detection circuit 2 even when the timer is not cleared by the CPU 1.

Figure 5:
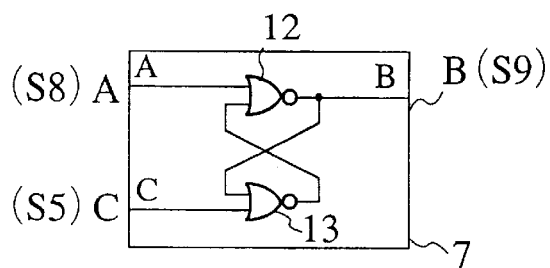
FIG. 5 is a block diagram illustrating the configuration of a counter clock control circuit used in a runaway detection circuit incorporated in the system illustrated in FIG. 4.

The configuration of the count clock control circuit 7 is shown in FIG. 5. Specifically, the count clock signal S8 originally provided to the runaway control circuit 2 is transmitted to a terminal A in the count clock control circuit 7, and the bus permission signal S5 is transmitted to a terminal C in the count clock control circuit 7. Then, the count clock signal S9 is transmitted from a terminal B in the count clock control circuit 7 to the runaway control circuit 2. In the configuration of the counter clock control signal 7 described above, when the bus permission signal S5 is inactive (High level in FIG. 6), the count clock signal S8 passes through the count clock control circuit 7 and it is transmitted as the count clock signal S9 through the terminal B in the count clock control circuit 7 to the runaway detection circuit 2.

As opposed to this, in the case where the bus permission signal S5 is active (Low level in FIG. 6), the output from the terminal B is halt and the count clock signal S9 is not transferred to the runaway detection circuit 2.

The operation related to the microprocessor system having the above-described configuration will now be described based on a timing chart illustrated in FIG. 6.

Figure 6:
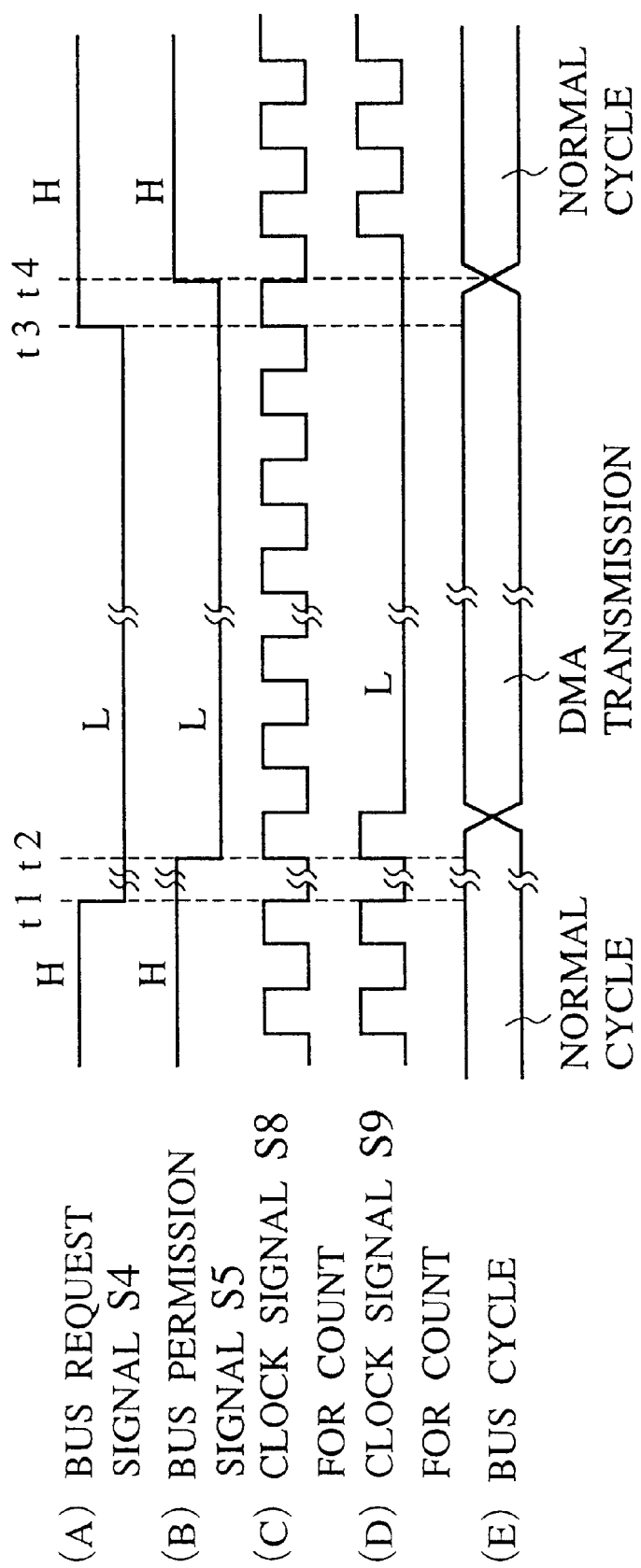
FIG. 6 is a timing chart for explaining the operation of the microprocessor system shown in FIG. 4.

In FIG. 6, the letter (A) designates a bus request signal S4 provided to the CPU 1 from the DMAC 3 or the external DMAC 5. The letter (B) designates the bus permission signal S5 transmitted to the DMAC 3 and the external DMAC 5 from the CPU 1, as well as being provided to the count clock control circuit 7. The letter (C) designates the count clock signal S8 provided to the count clock control circuit 7. The letter (D) designates the count clock signal S9 provided to the runaway control circuit 2 from the count clock control circuit 7. Finally, the letter (E) designates the bus cycle of the control bus 6.

Under the normal operation mode, when the bus request signal S4 is not transferred from both the DMAC 3 and the external DMAC 5 to the CPU 1, the count clock signal S8 passes through the count clock control circuit 7 and is provided as is to the runaway control circuit 2 as the counting clock signal S9.

In this condition described above, when the CPU 1 performs normally or correctly, a timer (not shown) in the runaway detection circuit 2 is cleared at each time within a specified time period (for example, within several milli seconds to a second) by the CPU 1 through the control bus 6. For this reason, the runaway control circuit 2 does not transmit an overflow signal to the CPU 1, DMAC 3, the external DMAC 5, and the external devices, so that the microprocessor system and the external devices operate normally.

When a program abnormality occurs and a timer clearance to the runaway control circuit 2 is not performed by the CPU 1, the timer in the runaway control circuit 2 counts the count clock signals S9 continuously, a time-out occurs, the overflow signal is generated in the runaway detection circuit 2 to detect a runaway. Based on this overflow signal, the system is optionally reset, and the system enters an abnormal return process such as a reset or the like as the result of a non-maskable interrupt (NMI) operation or the like.

At a time t1 shown in FIG. 6, when the bus request signal S4 is transmitted from the DMAC 3 or the external DMA controller 5 to the CPU 1, the CPU 1 transfers the bus permission signal S5 of Low level at a time t2 to the DMAC 3, the external DMAC 5, and the count clock control circuit 7, and the control bus 6 is released to the DMAC 3 or the external DMAC 5. As a result, a DMA transmission is executed by the DMAC 3 or the external DMAC 5.

During this DMA transmission operation, it is not possible to clear the timer in the runaway control circuit 2 by the CPU 1, therefore, a time-out occurs in the runaway control circuit 2. However, the bus permission signal S5 transmitted to the DMAC 3 or the external DMAC 5 from the CPU 1 is also provided to the count clock control circuit 7. As a result, in the count clock control circuit 7, the count clock signal S9 provided to the runaway control circuit 2 up to that time are halted during the DMA transmission operation only, as shown in (D) in FIG. 6, based on the bus permission signal S5. As a result, even though the runaway control circuit 2 is not cleared from the CPU 1, the subsequent count is halted so that there is no time-out and the condition remains as is.

Next, at a time t3 in FIG. 6, no bus request signal S4 is transmitted to the CPU 1 when the DMA transmission is completed by the DMAC 3 or the external DMAC 5. As a result, at a time t4, the bus permission signal S5 transferred from the CPU 1 is released and the control bus 6 also returns to the normal operation cycle.

From this time, a timer clearance signal (or a timer reset signal) provided from the CPU 1 through the control bus 6 is provided to the runaway control circuit 2. Simultaneously, the supply of the count clock signal S9 transmitted from the count clock control circuit 7 to the runaway control circuit 2 is commenced, therefore the runaway control circuit 2 once again operates normally.

As outlined above, in the case where the bus request signal S4 is provided to the CPU 1 from the DMAC 3 or the external DMAC 5, the CPU 1 does not carry out an interrupt process for prohibiting operation of the runaway control circuit 2 or the like, and the bus permission signal S5 returns to the DMAC 3 and the external DMAC 5 as is, so that the DMA process can be entered into without change. Because of this the operating efficiency of the system is strikingly improved.

In the runaway control circuit 2, even if the CPU 1 does not prohibit the operation of the process, the supply of the count clock signal S9 is halted because the count clock control circuit 7 is controlled by the bus permission signal S5. As a result, the operation of the watch dog timer 40 is stopped temporally, and concern about erroneous operation and detailed timing control becomes unnecessary.

In addition, a comparatively simple system can therefore be constructed because the operation of the runaway control circuit 2 is prohibited during the DMA operation so that no excess hardware or software is required.

Also, because the count clock signal S8 is only supplied to the runaway control circuit 2 in a normal CPU cycle, there is no relation to asynchronous transfer of bus rights to use the control bus 6, so that original timing clearance of the runaway control circuit 2 can be easily performed.

In the above embodiment, the configuration by which the count clock signal S9 supplied to the runaway control circuit 2 through the count clock control circuit 7 is prohibited when the control bus 6 is pre-empted by the DMAC 3 and the external DMAC 5 is given as an example. However, the scope of the present invention is not limited by this embodiment.

Figure 7:
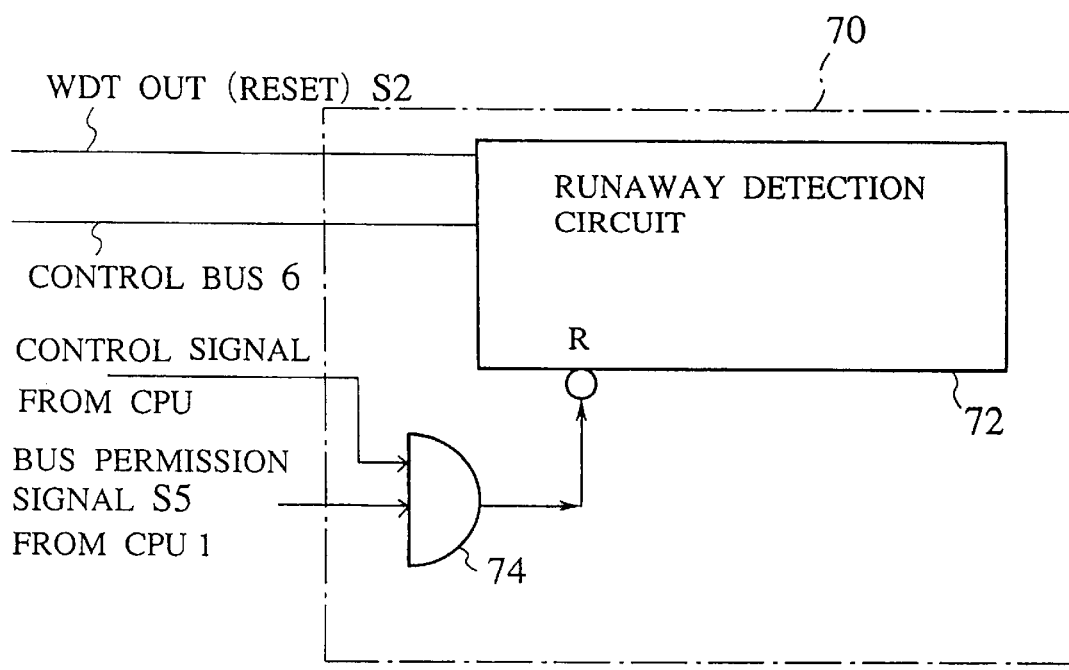
FIG. 7 is a partial block diagram of another embodiment of a watchdog timer device of the present invention.

FIG. 7 shows an another configuration diagram of a watch dog timer device 70 having a runaway detection circuit 72 as another embodiment of the present invention.

As shown in the partial block diagram of a microprocessor system having the watch dog timer device 70 including a runaway detection circuit 72, the bus permission signal S5 is supplied to one input terminal of an AND circuit 74, and then the output from the AND circuit 74 is transmitted to a forced reset terminal R of the runaway control circuit 2 is also acceptable.

In this embodiment of the watch dog timer device 70, it is required to incorporate an AND circuit 74 instead of the count clock control circuit 7 used in the first embodiment of the watch dog timer device 40 shown in FIG. 4.

By means of the microprocessor systems having the watch dog timer devices 40 and 70 having the configurations shown in FIG. 4 and FIG. 7, the operation of the runaway control circuits 2 and 72 in the watch dog timer device 40 and 70 can be forcibly terminated by the forcible resetting of the runaway control circuit by the bus permission signal S5 from the CPU 1 when the control bus 6 is used by the DMAC 3 and the external DMAC 5. In this case, even when a reset signal for resetting a timer in the runaway detection circuit is not provided from the CPU 1 through the control bus 6 like a conventional microprocessor system and even if a clock pulse is supplied continuously from an external device, the runaway control circuit 2 is set in an ordinary forcible reset condition so that the runaway control circuit 2 is prohibited prior to the DMA transmission operation in exactly the same manner as previously stated. Therefore it is not necessary to add an interrupt process or the like by which the prohibition is released after the completion of the DMA transmission operation, or to add a large amount of hardware and software, but the same effect can be obtained.

As outlined above, the watch dog timer device incorporated in the microprocessor system according to the present invention provides a configuration whereby the operation of the watch dog timer temporarily halts during the operation of a bus master such as a DMAC, an external DMAC, or the like by prohibiting a clock pulse to be supplied to the watch dog timer device and forcibly resetting the watch dog timer device, so that it is not necessary for the CPU to prohibit the watch dog timer operation or to release this prohibition after the completion of the DMA transmission operation by an interrupt process, or to provide a large amount of hardware and software. It is therefore possible to detect a runaway detection and restore the process with high reliability without causing the performance of the microprocessor system to drop.

What is claimed is:

1. A watch dog timer device in a microprocessor system for detecting a runaway state of said microprocessor system, said microprocessor system including a central processing unit (CPU), a direct memory access controller (DMAC), and a bus connected to the CPU and the DMAC, comprising:

watch dog timer means for receiving a count clock signal, counting the number of said count clock signal and storing a count result, receiving a reset signal to reset said count result stored in said watch dog timer means at each specified time period, and transmitting a watch dog time out signal to said CPU, said watch dog timer means itself, and a first external device to inform an abnormal state of said microprocessor system when a count result is over a predetermined value; and count clock control means for receiving said count clock signal transmitted from a second external device and transmitting said count clock signal to said watch dog timer means, and for halting a transmission of said count clock signal transmitted from an external device to said watch dog timer means when said CPU transmits a bus permission signal to said DMAC for using said bus by said DMAC.

2. A watch dog timer device as claimed in claim 1, wherein said count clock control means comprises two NOR circuits.

3. A watch dog timer device in a microprocessor system for detecting a runaway state of said microprocessor system, said microprocessor system including a central processing unit (CPU), a direct memory access controller (DMAC), and a bus connected to the CPU and the DMAC, comprising:

watch dog timer means for receiving a count clock signal, counting the number of said count clock signal and storing a count result, receiving a reset signal to reset said count result stored in said watch dog timer means at each specified time period, and transmitting a watch dog time out signal to said CPU, said watch dog timer means itself, and a first external device to inform an abnormal state of said microprocessor system when a count result is over a predetermined value; and count clock control means for receiving said count clock signal transmitted from a second external device and transmitting said count clock signal to said watch dog timer means, and for halting a transmission of said count clock signal transmitted from an external device to said watch dog timer means under a condition that said DMAC uses said bus.

4. A watch dog timer device in a microprocessor system for detecting a runaway state of said microprocessor system, said microprocessor system including a central processing unit (CPU), a direct memory access controller (DMAC), and a bus connected to the CPU and the DMAC, comprising:

watch dog timer means for receiving a count clock signal, counting the number of said count clock signal and storing a count result, receiving a reset signal to reset said count result stored in said watch dog timer means at each specified time period, and transmitting a watch dog time out signal to said CPU, said watch dog timer means itself, and a first external device to inform an abnormal state of said microprocessor system when a count result is over a predetermined value; and timer control means for resetting said watch dog timer means when said CPU transmits a bus permission signal to said DMAC for using said bus.

5. A watch dog timer device as claimed in claim 4, wherein said count clock control means comprises an AND circuit.

6. A watch dog timer device, incorporated in a microprocessor system for detecting a runaway state of said microprocessor system, said microprocessor system including a central processing unit (CPU), a direct memory access controller (DMAC), and a bus connected to the CPU and the DMAC, comprising:

watch dog timer means for receiving a count clock signal, counting the number of said count clock signal and storing a count result, receiving a reset signal to reset said count result stored in said watch dog timer means at each specified time period, and transmitting a watch dog time out signal to said CPU, said watch dog timer means itself, and an external device to inform an abnormal state of said microprocessor system when a count result is over a predetermined value; and timer control means for resetting said watch dog timer means while said DMAC uses said bus.

7. A microprocessor system for detecting a runaway state, comprising:

a central processing unit (CPU) for controlling the microprocessor system;

a direct memory access controller (DMAC) for controlling operation of memories;

a watch dog timer; and a bus connecting the CPU, the DMAC, and the watch dog timer, wherein said watch dog timer includes:

watch dog timer means for receiving a count clock signal, counting the number of said count clock signal and storing a count result, receiving a reset signal to reset said count result stored in said watch dog timer means at each specified time period, and transmitting a watch dog time out signal to said CPU, said watch dog timer means itself, and a first external device to inform an abnormal state of said microprocessor system when a count result is over a predetermined value; and count clock control means for receiving said count clock signal transmitted from a second external device and transmitting said count clock signal to said watch dog timer means, and for halting a transmission of said count clock signal transmitted from an external device to said watch dog timer means when said CPU transmits a bus permission signal to said DMAC for using said bus by said DMAC.

8. A microprocessor system for detecting a runaway state, comprising:

a central processing unit (CPU) for controlling the microprocessor system;

a direct memory access controller (DMAC) for controlling operation of memories;

a watch dog timer; and a bus connecting the CPU, the DMAC, and the watch dog timer, wherein said watch dog timer includes:

watch dog timer means for receiving a count clock signal, counting the number of said count clock signal and storing a count result, receiving a reset signal to reset said count result stored in said watch dog timer means at each specified time period, and transmitting a watch dog time out signal to said CPU, said watch dog timer means itself, and an external device to inform an abnormal state of said microprocessor system when a count result is over a predetermined value; and timer control means for resetting said watch dog timer means while said DMAC uses said bus.

9. A method for controlling a microprocessor system, comprising the steps of:

running a watch dog timer;

transmitting a direct memory access (DMA) request to a central processing unit (CPU) by a DMA controller;

issuing a bus permission signal by the CPU;

receiving the bus permission signal by the watch dog timer and the DMA controller;

in response to the bus permission signal, altering an operation of the watch dog timer and performing DMA transfer using the DMA controller.

10. A method according to claim 9, wherein the steps of transmitting a DMA request and issuing a bus permission signal are performed without an interrupt processing within the CPU.

11. A method according to claim 9, wherein the step of altering the operation of the watch dog timer halts the watch dog timer.

12. A method according to claim 9, wherein the step of altering the operation of the watch dog timer resets the watch dog timer.

13. A method according to claim 9, wherein the step of altering the operation of the watch dog timer is performed without transmitting a signal on a control bus, which is connected between the CPU, the watch dog timer, and the DMA controller, from the CPU to the watch dog timer.

14. A microprocessor system, comprising:

a watch dog timer;

a central processing unit (CPU);

a direct memory access (DMA) controller;

a control bus connected to the watch dog timer, the CPU and the DMA controller;

a bus permission line, different from the control bus, connected between the CPU, the DMA controller, and the watch dog timer;

wherein:

the CPU includes means for issuing a bus permission signal on the bus permission line in response to a DMA request by the DMA controller;

the watch dog timer includes means for altering an operation thereof in response to the bus permission signal; and the DMA controller includes means for performing a DMA transfer in response to the bus permission signal.

15. A system according to claim 14, wherein:

the means for altering an operation of the watch dog timer operates without performing an interrupt processing within the CPU.

16. A system according to claim 14, wherein the means for altering includes a means for halting the operation of the watch dog timer.

17. A system according to claim 14, wherein the means for altering includes a means for resetting the operation of the watch dog timer.

18. A system according to claim 14, wherein the means for altering the operation of the watch dog timer operates without transmitting a signal on the control bus from the CPU to the watch dog timer.

19. A watch dog timer device comprising:

a runaway detection circuit for counting a count clock signal and outputting a reset signal when overflow is caused; and a count clock controller for supplying said count clock signal to said runaway detection circuit, receiving a bus permission signal from a CPU and halting the supplying of said count clock signal to said runaway detection circuit when said bus permission signal is received.

20. A system, comprising:

a runaway detection circuit including a counter which counts a clock signal and outputs a reset signal upon an overflow condition; and a controller having an input which receives a bus permission signal and an output connected to said runaway detection circuit which prevents outputting by said runaway detection circuit of said reset signal when said input receives the bus permission signal.

21. A system according to claim 20, further comprising:

a CPU which generates the bus permission signal.

22. A system according to claim 20, wherein:

the controller halts the supplying of the clock signal to the counter when the controller receives the bus permission signal.

* * * * *